United States Patent
Nakaho et al.

(10) Patent No.: US 6,337,624 B1
(45) Date of Patent: Jan. 8, 2002

(54) REAR VIEW MIRROR APPARATUS AND METHOD FOR CONTROLLING THE SAME

(75) Inventors: Junichi Nakaho; Koichi Ono, both of Aichi-ken (JP)

(73) Assignee: Kabushiki Kaisha Tokai Rika Denki Seisakusho, Niwa-gun (JP)

( * ) Notice: Subject to any disclaimer, the term of this patent is extended or adjusted under 35 U.S.C. 154(b) by 0 days.

(21) Appl. No.: 09/322,479

(22) Filed: May 28, 1999

(30) Foreign Application Priority Data

Jun. 1, 1998 (JP) .......................................... 10-151624

(51) Int. Cl.[7] ................................................ B60Q 1/34
(52) U.S. Cl. ........................ 340/475; 359/267; 359/604; 362/140; 362/494
(58) Field of Search ......................... 340/475; 362/494, 362/135, 140; 359/603, 604, 265, 267, 602, 605; 280/735; 180/272

(56) References Cited

U.S. PATENT DOCUMENTS

| 5,486,952 A | * | 1/1996 | Nagao et al. ................ 359/603 |
| 5,541,762 A | * | 7/1996 | Levy ............................ 359/265 |
| 5,829,782 A | * | 11/1998 | Breed et al. ................. 280/735 |
| 5,940,201 A | * | 8/1999 | Ash et al. .................... 359/267 |
| 6,019,475 A | * | 2/2000 | Lynam et al. ................ 359/604 |

FOREIGN PATENT DOCUMENTS

JP        08-253076        10/1996

* cited by examiner

Primary Examiner—Brent A. Swarthout
(74) Attorney, Agent, or Firm—Crompton, Seager & Tufte, LLC

(57) ABSTRACT

A rear view mirror having a first portion and a second portion. The reflectance of the first portion is variably controlled. The reflectance of the second portion is also variably controlled, though independently from the first portion.

23 Claims, 4 Drawing Sheets

REAR VIEW MIRROR APPARATUS AND METHOD FOR CONTROLLING THE SAME

BACKGROUND OF THE INVENTION

The present invention relates to door mirrors and rear view mirrors that are employed in automobiles. More particularly, the present invention pertains to mirrors having a plurality of reflectors.

Mirrors having an aspheric reflector and a spherical reflector are known in the art. In such mirrors, the average radius of curvature of the aspheric reflector is greater than the radius of curvature of the spherical reflector. Accordingly, a mirror having an aspheric reflector has a wider view than a mirror having spherical or flat reflectors.

However, when a door mirror has an aspheric reflector, the continuously varying radius of curvature of the reflector reflects an imbalanced image and may thus cause the driver to misperceive distances. For the same reason, a rear view mirror having reflectors with differing radii of curvature to provide a wider view may also cause the driver to misperceive distances.

SUMMARY OF THE INVENTION

Accordingly, it is an objective of the present invention to provide a mirror that improves the visibility of images without confusing the driver.

To achieve the above objectives, the present invention provides a rear view mirror apparatus for a vehicle, which includes a first mirror portion, a second mirror portion located near the first mirror portion, a reflectance regulating means associated with the first mirror portion to regulate the reflectance of the first mirror portion, and a control circuit for controlling the reflectance of the first mirror portion based on current driving conditions by regulating a characteristic of the reflectance regulating means based on current driving conditions.

Also, the present invention provides a method of controlling a rear view mirror including generating a turning signal when a predetermined condition indicating that the vehicle is changing direction is met, generating a second signal when a predetermined condition indicating that relatively strong light is being emitted from behind the vehicle is met, and increasing the reflectance of a first mirror part of a multi-part mirror when the signals indicate that the vehicles is turning in the absence of relatively strong rearward light.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
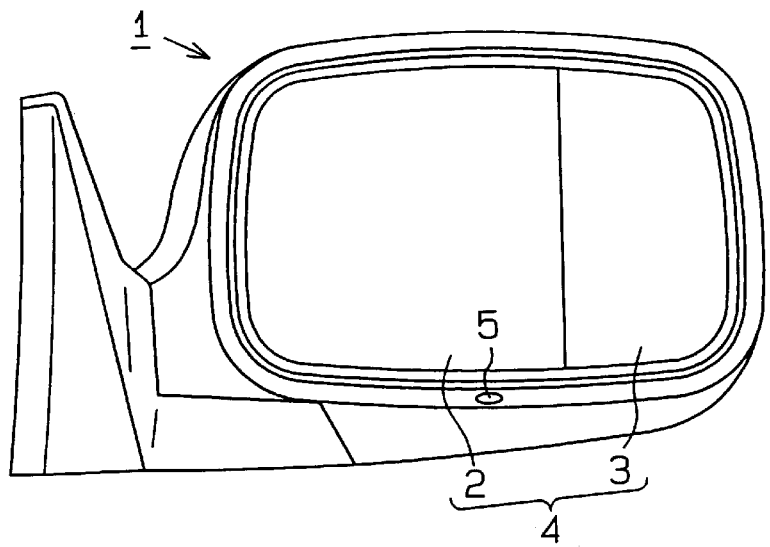
FIG. 1 front view of a door mirror according to a first embodiment of the present invention.
Figure 2:
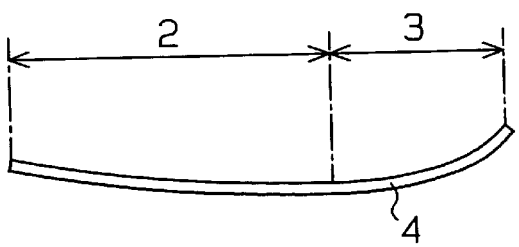
FIG. 2 is a top plan view showing a mirror body of the mirror of FIG. 1.

A first embodiment according to the present invention will now be described with reference to FIGS. 1 to 9. FIG. 1 is a front view showing a door mirror 1 having improved visibility. The door mirror 1 has a mirror body 4, which includes a first, or outer portion 3 and a second, or inner portion 2. In this embodiment, the first portion 3 is aspheric convex, and the second portion 2 is spherical convex.

The door mirror 1 is mounted on the left and right doors of an automobile. The left and right door mirrors 1 are symmetric about a vertical plane that longitudinally bisects the automobile. Therefore, the description will focus primarily on the right door mirror 1. The first portion 3 of the right door mirror 1, which widens the right view for a driver, is located to the right of the second portion 2. The first portion 3 of the left door mirror 1 is located to the left of the second portion 2.

In this embodiment, the average radius of curvature of the first portion 3 is greater than the radius of curvature of the second portion 2. A rear light sensor 5 is arranged on the lower portion of the mirror body 4. The light sensor 5 has an exposed light receiving portion.

Figure 3:
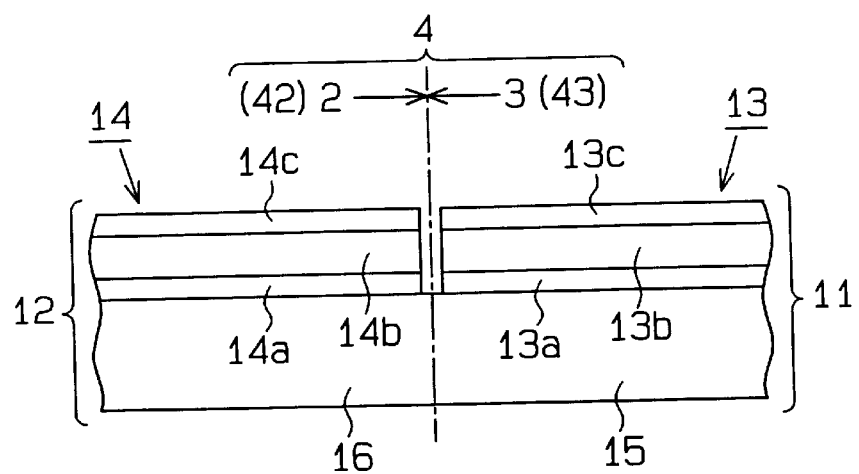
FIG. 3 is a schematic top plan view showing the structure of the mirror body in the first and second embodiments.

As shown in FIG. 3, the mirror body 4 has a first reflector 11, which includes-a reflective film 13c, and a second reflector 12, which includes a reflective film 14c. The first reflector 11, which is associated with the first portion 3, includes a first piece of glass 15 and a first electrochromic (EC) layer 13. The first EC layer 13, which serves as a first variable reflectance portion, is located in front of, or on the inner surface (i.e., upper side as viewed in FIG. 3) of the first piece of glass 15. The second reflector 12, which is associated with the second portion 2, has a second piece of glass 16 and a second EC layer 14. The second EC layer 14, which serves as a second variable reflectance portion, is located in front of, or on the inner surface of, or on the inner surface of the second piece of glass 16.

The first EC layer 13 includes a transparent electrode 13a, a coloring film 13b, and a reflective film 13c, which serves as a counter electrode. The transparent electrode 13a is fixed to the first piece of glass 15. The reflective film 13c extends parallel to the transparent electrode 13a with the coloring film 13b located in between. Coloring of the coloring film 13b occurs when a positive electric potential is applied to the transparent electrode 13a or the reflective film 13c and a negative electric potential is applied to the other. To decolor the coloring film 13b, the negative electric potential and the positive electric potential are reversed.

In this embodiment, the coloring film 13b is colored when a positive electric potential is applied to the transparent electrode 13a and a negative electric potential is applied to the reflective film 13c. The coloring of the coloring film 13b substantially blocks the transmission of light to the reflective plate 13c. In the colored state, the visibility of the image reflected in the first piece of glass 15 is lowered.

Furthermore, in this embodiment, the coloring film 13b is decolored when a negative electric potential is applied to the transparent electrode 13a and a positive electric potential is applied to the reflective film 13c. The decoloring of the coloring film 13b permits the transmission of light to the reflective plate 13c. In the decolored state, the visibility of the image reflected in the first piece of glass 15 is increased. Like the first EC layer 13, the second EC layer 14 includes a transparent electrode 14a, a coloring film 14b, and a reflective film 14c, which function in the same manner as those of the first EC layer 13.

The electric structure for variably controlling the reflectance of the first and second EC layers 13, 14 will now be described with reference to the block diagram shown in FIG. 4.

Figure 4:
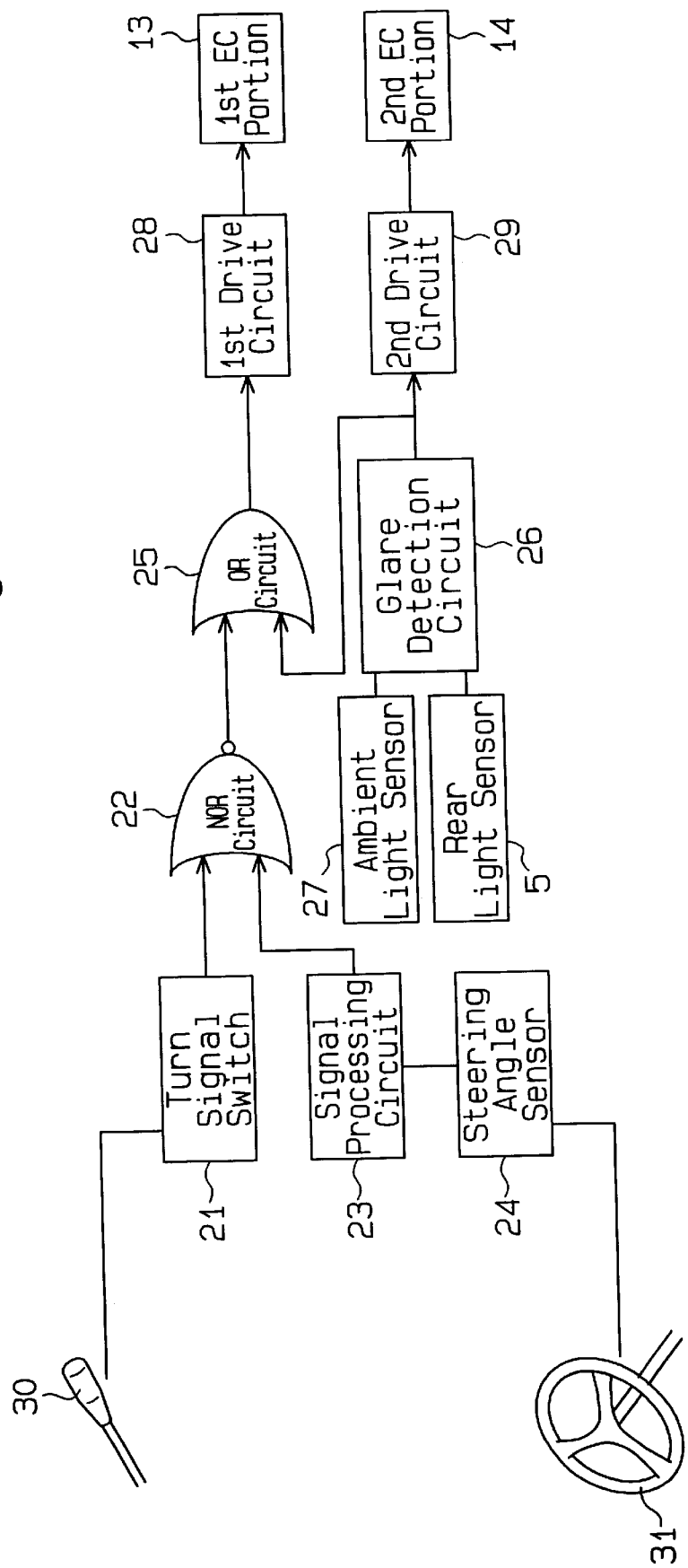
FIG. 4 is a block diagram showing the electric structure for variably controlling the reflectance of the first and second EC layers.

As shown in FIG. 4, a turn signal switch 21 is connected to one of the two input terminals of an NOR circuit 22. A turn indicator lever 30 is moved to actuate the turn signal switch 21 and send an ON signal (H-level signal) to the NOR circuit 22. The turn signal switch 21 is actuated, for example, when the driver moves the turn signal upward or downward to indicate that the automobile will turn.

The other input terminal of the NOR circuit 22 is connected to a steering angle sensor 24 by way of a signal processing circuit 23. The steering angle sensor 24 detects the steering angle of a steering wheel 31. The signal processing circuit 23 sends an H-level signal to the NOR circuit 22 when the steering angle becomes equal to or greater than a predetermined threshold value.

The output terminal of the NOR circuit 22 is connected to one of the two input terminals of an OR circuit 25. The other input terminal of the OR circuit 25 is connected to the output terminal of a glare detection circuit 26. The glare detection circuit 26 is connected to an ambient light sensor 27 and the rear light sensor 5. The ambient light sensor 27 is located near the door mirror 1 to detect the intensity of light at that location. The rear light sensor detects the intensity of the light radiated from the rear. The glare detection circuit 26 electrically processes the difference between the light intensity detected by the ambient light sensor 27 and that detected by the rear light sensor 5. The processing result is then sent to the OR circuit 25 from the glare detection circuit 26.

The output terminal of the OR circuit 25 is connected to the input terminal of a first drive circuit 28, which is further connected to the first EC layer 13. The first drive circuit 28 variably controls the reflectance of the first EC layer 13. That is, the first drive circuit 28 applies a negative electric potential to the transparent electrode 13a and a positive electric potential to the reflective film 13c when receiving an L-level signal from the OR circuit 25. Under such conditions, the first EC layer 13 enters a decolored state. On the other hand, the first drive circuit 28 applies a positive electric potential to the transparent electrode 13a and a negative electric potential to the reflective film 13c when receiving an H-level signal from the OR circuit 25. Under such conditions, the first EC layer 13 enters a colored state.

The output terminal of the glare detection circuit 26 is also connected to the input terminal of a second drive circuit 29. The second drive circuit 29 variably controls the reflectance of the second EC layer 14. That is, the second drive circuit 29 applies a negative electric potential to the transparent electrode 14a and a positive electric potential to the reflective film 14c when receiving an L-level signal from the glare detection circuit 26. Under such conditions, the second EC layer 14 enters a decolored state. On the other hand, the second drive circuit 29 applies a positive electric potential to the transparent electrode 14a and a negative electric potential to the reflective film 14c when receiving an H-level signal from the glare detection circuit 26. Under such conditions, the second EC layer 14 enters a colored state.

In this embodiment, the first and second drive circuits 28, 29 serve as a controller. The turn signal switch 21, the signal processing circuit 23, the steering angle sensor 24, and the NOR circuit 22 serve as a first trigger, while the rear light sensor 5, the glare detection circuit 26, and the ambient light sensor 27 serve as a second trigger.

A non-turning state refers to a state in which the turning signal switch 21 remains off and the steering wheel angle remains lower than the predetermined threshold value. When the vehicle is in the non-turning state and a relatively strong light is not being radiated from rearward vehicles (e.g., when driving in the daytime), the door mirror 1 operates as described below.

When the turn signal switch 21 is off, an OFF signal (L-level signal) is sent to one of the input terminals of the NOR circuit 22. The other input terminal of the NOR circuit 22 receives a further L-level signal from the signal processing circuit 23 if the steering wheel angle is lower than the predetermined threshold value. Accordingly, the L-level signals sent to the two input terminals of the NOR circuit 22 causes the NOR circuit 22 to output an H-level signal. The H-level signal is sent to one of the input terminals of the OR circuit 25.

If the rear light sensor 5 does not receive a relatively strong light radiated by rearward vehicles (e.g., when driving in the daytime), the difference between the light intensity detected by the ambient light sensor 27 and that detected by the rear light sensor 5 is small. In such state, the glare detection sensor 26 sends an L-level signal to the other input terminal of the OR circuit 25. Since one of input terminals of the OR circuit 25 receives an H-level signal, the OR circuit 25 outputs an H-level signal, which is sent to the first drive circuit 28.

When receiving the H-level signal, the first drive circuit 28 applies a positive electric potential to the transparent electrode 13a and a negative electric potential to the reflective film 13c so that the first EC layer 13 is colored. In this state, the coloring film 13b is colored to substantially block the transmission of light to the reflective plate 13c and thereby decrease the reflectance of the first EC layer 13, which is associated with the first portion 3. This lowers the visibility of the image reflected by the first piece of glass 15.

A turning state is a state in which either the turning signal switch 21 is turned on or the steering wheel angle is equal to or greater than the predetermined threshold value. If the vehicle is in the turning state, and a relatively strong light is not radiated from rearward vehicles (e.g., when driving in the daytime), the door mirror 1 operates as described below.

Since the turn indicator lever 30 is moved or the steering wheel angle is equal to or greater than the predetermined threshold value, at least one of the two input terminals of the NOR circuit 22 receives an H-level signal. In this case, an L-level signal is output from the NOR circuit 22 and sent to one of the input terminals of the OR circuit 25. The other input terminal of the OR circuit 25 also receives an L-level signal because, as stated above, in this example, no glare is present. Since L-level signals are received by both input terminals of the OR circuit 25, the OR circuit 25 sends an L-level signal to the first drive circuit 28.

When receiving an L-level signal, the first drive circuit 28 applies a negative electric potential to the transparent electrode 13a and a positive electric potential to the reflective film 13c to decolor the first EC layer 13. When decolored, the coloring film 13b of the first EC layer 13 becomes transparent and permits the reflection of external light with the reflective plate 13c. Accordingly, the reflectance of the first EC layer 13, which is associated with the first portion 3, increases. Thus, the visibility of the image reflected in the first piece of glass 15 increases and provides a wider view, which is helpful to the driver when turning.

In this embodiment, the reflectance of the first EC layer 13, which is associated with the first portion 3, increases when turning in the absence of glare. This increases the visibility of the image reflected in the first piece of glass 15 and provides a wider view in which the driver can recognize images. On the other hand, the reflectance of the first EC layer 13 decreases when turning in the presence of glare or when not turning. This decreases the visibility of the image reflected by the first piece of glass 15, which prevents the driver from misperceiving distances due to the varying radius of curvature.

The operation of the door mirror 1 when a relatively strong light is radiated from a rearward vehicle (e.g., when driving at nighttime or in tunnels) in the non-turning state will now be described.

If a strong light from a rearward vehicle is received by the rear light sensor 5 in the non-turning state, the difference between the light intensity detected by the ambient light sensor 27 and that detected by the rear light sensor 5 becomes large. Thus, one of the input terminals of the OR circuit 25 receives an H-level signal from the glare detection circuit 26. The other input terminal of the OR circuit 25 also receives an H-level signal because the NOR circuit 22 outputs an H-level signal in the non-turning state. Since the two input terminals of the OR circuit 25 both receive H-level signals, the OR circuit 25 outputs an H-level signal.

The H-level signal output by the OR circuit 25 is sent to the first drive circuit 28. The first drive circuit 28 then applies a positive electric potential to the transparent electrode 13a and a negative electric potential to the reflective film 13c to color the first EC layer 13. Accordingly, the coloring of the coloring film 13b decreases the reflectance of the first EC layer 13, which corresponds to the first portion 3.

Furthermore, when the second drive circuit 29 receives the H-level signal from the glare detection circuit 26, the second drive circuit 29 applies a positive electric potential to the transparent electrode 14a and a negative electric potential to the reflective film 14c to color the second EC layer 14. Accordingly, the coloring of the coloring film 14b decreases the reflectance of the second EC layer 14, which is associated with the second portion 2. As a result, glare does not interfere with the driver's recognition of images reflected in the first and second pieces of glass 15, 16.

The operation of the door mirror 1 when a relatively strong light is radiated from a rearward vehicle (e.g., when driving in the nighttime or in tunnels) in the turning state will now be described.

If a relatively strong light from a rearward vehicle is received by the rear light sensor 5 in the turning state, one of the input terminals of the OR circuit 25 receives an L-level signal from the NOR circuit 22, while the other input terminal of the OR circuit 25 receives an H-level signal from the glare detection circuit 26. Thus, the OR circuit 25 outputs an H-level signal. Accordingly, both first and second drive circuits 28, 29 receive H-level signals, which colors the associated first and second EC layers 13, 14. As a result, glare does not interfere with the driver's recognition of images reflected in the first and second pieces of glass 15, 16.

The advantages of this embodiment are described below.

(1) In the tuning state, when no glare is present, the first drive circuit 28 decolors the first EC layer 13 to increase the reflectance of the first EC layer 13. This increases the visibility of the image reflected in the first piece of glass 15 and widens the driver's view. In the non-turning state, the first drive circuit 28 colors the first EC layer 13 to decrease the reflectance of the first EC layer 13. This decreases the visibility of the image reflected in the first piece of glass 15 and prevents the driver from misperceiving distances due to the difference in radius of curvature between the first and second pieces of glass 15, 16. In other words, this compensates for the difference in radius of curvature between the first and second pieces of glass 15, 16.

(2) Regardless of whether the vehicle is turning, if the rear light sensor 5 receives relatively strong light from a rearward vehicle (e.g., when driving in the nighttime or in tunnels), the first and second drive circuits 28, 29 color and decrease the reflectance of the associated first and second EC layers 13, 14. This prevents glare from interfering with the driver's recognition of images reflected in the first and second pieces of glass 15, 16.

(3) In this embodiment, electrochromic portions are employed to vary the reflectance of the door mirror 1. This results in advantages (1) and (2).

(4) The average radius of curvature of the first portion 3 is greater than the radius of curvature of the second portion 2. This provides a wider view in comparison to a door mirror having a constant radius of curvature. Accordingly, if the first drive circuit 28 decolors the first EC layer 13, the visibility of the image reflected in the first piece of glass 15 increases, which widens the driver's view.

The operation of the door mirror 1 is also described in the following table.

TABLE

| | NO TURN | | TURNING | |
| --- | --- | --- | --- | --- |
| | GLARE | NO GLARE | GLARE | NO GLARE |
| 1st portion | colored | colored | colored | decolored |
| 2nd portion | colored | decolored | colored | decolored |

A second embodiment according to the present invention will now be described with reference to the drawings. To avoid redundancy, like or same reference numerals are given to those components that are the same as the corresponding components of the first embodiment.

Figure 5:
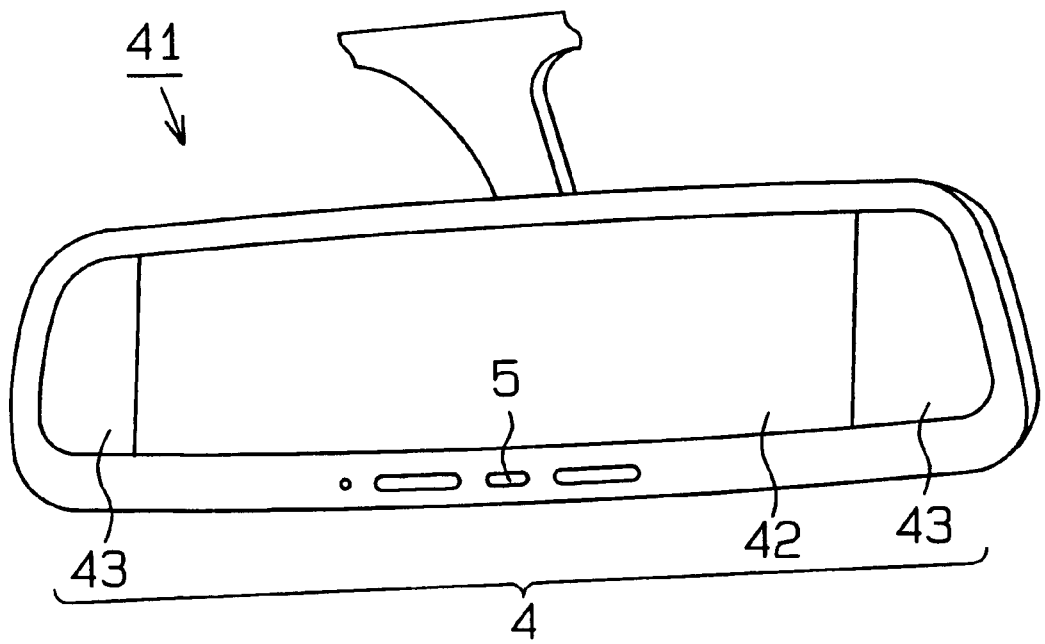
FIG. 5 is a rear view mirror according to a second embodiment of the present invention.
Figure 6:
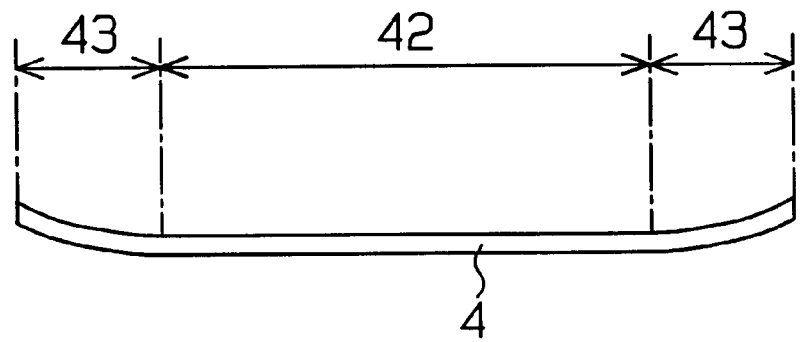
FIG. 6 is a top plan view showing the mirror body of the mirror of FIG. 5.

FIG. 5 shows a rear view mirror 41 used in an automobile. The rear view mirror 41 has a mirror body 4, which includes a flat portion 42 and curved portions 43. The curved portions 43 are located on each side of the flat portion 42 to widen the left and right views. Since the radius of curvature of the flat portion 42 is zero, the radius of curvature of the curved portions 43 is greater than that of the flat portion 42.

The mirror body 4 has a first EC layer 13 located in front of, or on the inner surface of a first piece of glass 15, which corresponds to the curved portion 43, and a second EC layer 14 located in front of, or on the inner surface of a second piece of glass 16, as shown in FIG. 3. The reflectances of the first and second EC layers 13, 14 are variably controlled by the same electric structure as the first embodiment (FIG. 4).

In addition to advantages (1) to (4) of the first embodiment, the second embodiment has the advantage described below.

(5) The curved portions 43, which are located on the left and right sides of the flat portion 43, each have a radius of curvature that is greater than the flat portion 43. Therefore, the rear view mirror 41 has a wider view in comparison with a totally flat rear view mirror. Accordingly, if the first drive circuit 28 decolors the first EC layer 15, the reflectance of the first EC layer 13 increases. This increases the visibility of the image reflected by the first piece of glass 15 and provides a wider view. Furthermore, since the curved portions 43 are located on the left and right sides of the flat portion 42, both leftward and rightward views are widened simultaneously to assist the driver in recognizing images at the left and right sides of the vehicle.

It should be apparent to those skilled in the art that the present invention may be embodied in many other specific forms without departing from the spirit or scope of the invention. Particularly, it should be understood that the present invention may be embodied in the following forms.

In the illustrated embodiments, signals (H-level and L-level) are output by the turn signal switch 21 and the signal processing circuit 23, which form the first trigger, to automatically vary the reflectances of the first portion 3 of the door mirror 1 or the curved portions 43 of the rear view mirror 41. However, the reflectances of the first portion 3 and the curved portions 43 may be varied by employing a manual switch, which would serve as a first trigger, in lieu of the turn signal switch 21 and the signal processing circuit 23.

In the illustrated embodiments, the first drive circuit 28 variably controls the reflectance of the first EC layer 13, while the second drive circuit 29 variably controls the reflectance of the second EC layer 14. However, the reflectances of the first and second EC layers 13, 14 may be variably controlled by a single drive circuit.

In the illustrated embodiments, electrochromic portions are employed as the first and second variable reflectance portions. However, a liquid crystal layer may be employed instead of the EC layer as the first and second variable reflectance portions.

In the illustrated embodiments, the second EC layer 14 is arranged in correspondence with the second portion 2 of the door mirror 1 and the flat portion 42 of the rear view mirror 41. However, the second EC layer 14 may be eliminated. That is, the door mirror 1 or the rear view mirror 41 may be provided with only one EC layer in association with the first portion 3 or the curved portion 43.

In the rear view mirror 41 of the second embodiment, the curved portions 43 are located on each side of the flat portion 42. However, the present invention may also be applied to a rear view mirror having a single curved portion 43, which is located on one side of the flat portion 42.

In the illustrated embodiments, the turn signal switch 21, the signal processing circuit 23, and the steering angle sensor 24 form the first trigger, which variably controls the reflectance of the first EC layer 13 with the signals output from the turn signal switch 21 and the signal processing circuit 23. However, the turn signal switch 21 may be eliminated from the first trigger. In this case, the reflectance of the first EC layer 13 is variably controlled only by the signals output by the signal processing circuit 23.

Alternatively, the signal processing circuit 23 may be eliminated from the first trigger. In this case, the reflectance of the first EC layer 13 is variably controlled only by the signals output by the turn signal switch 21.

In the illustrated embodiments, curved portions are employed to form the mirror body 4. However, the present invention may also be applied to a mirror body formed from more than one flat portion.

Figure 7:
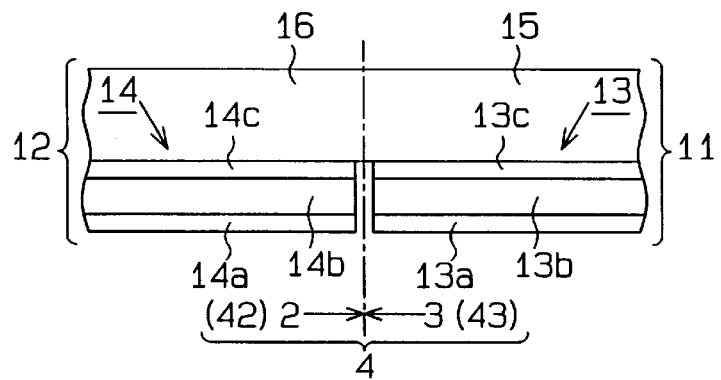
FIG. 7 is a schematic top plan view showing the mirror body structure of a mirror according to a further embodiment of the present invention.
Figure 8:
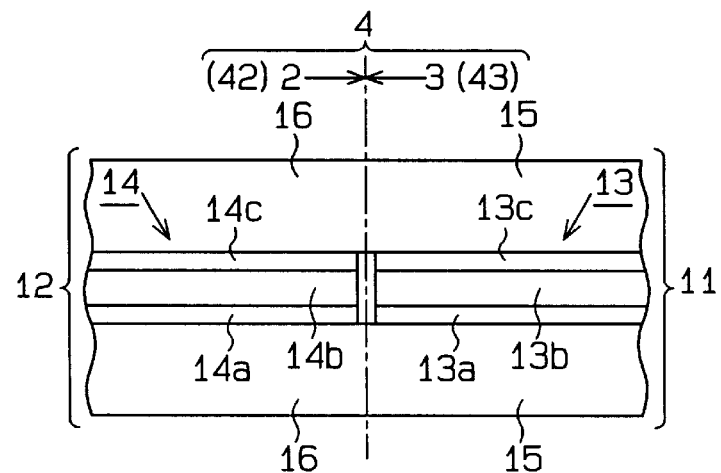
FIG. 8 is a schematic top plan view showing the mirror body structure of a mirror according to a further embodiment of the present invention.
Figure 9:
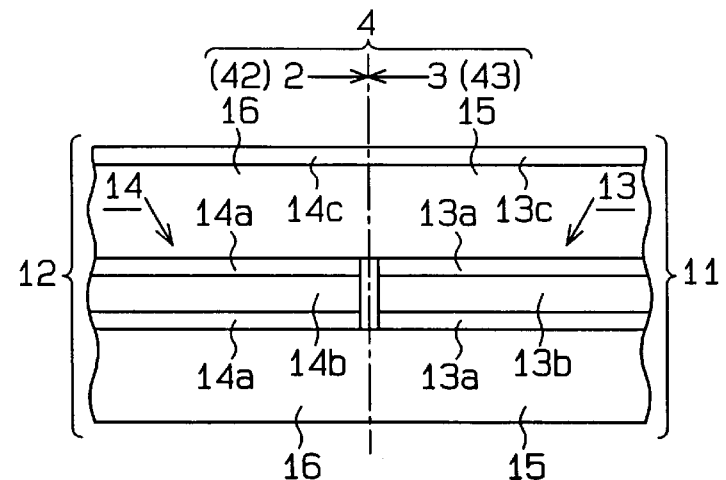
FIG. 9 is a schematic top plan view showing the mirror body structure of a mirror according to a further embodiment of the present invention.

In the first and second embodiments, the mirror body 4 includes the first piece of glass 15, the first EC layer 13 located at the inner side of the first piece of glass 15, the second piece of glass 16, and the second EC layer 14 located in front of the second piece of glass 16, as shown in FIG. 3. However, the structure of the mirror body 4 may be altered as shown in FIGS. 7 to 9.

As shown in 7, the mirror body 4 may be formed by arranging the first EC layer 13 on the rear side, or outer surface (lower side as viewed in 7) of the first piece of glass 15 and by arranging the second EC layer 14 on the rear side of the second piece of glass 16. Alternatively, as shown in FIG. 8, the mirror body 4 may be formed by arranging the first EC layer 13 between a pair of first pieces of glass 15 and the second EC layer 14 between a pair of second pieces of glass 16. As another option, as shown in 9, the mirror body 4 may be formed by arranging the coloring film 13b between a pair of transparent electrodes 13a and the coloring film 14b between a pair of transparent electrodes 14a. The coloring film 13b and the transparent electrodes 13a are arranged between a pair of first pieces of glass 15, while the coloring film 14b and the transparent electrodes 14a are arranged between a pair of second pieces of glass 16. The reflective film 13c is arranged at the inner side of the rear first piece of glass 15 (the upper one as viewed in FIG. 9), while the reflective film 14c is arranged at the inner side of the rear second piece of glass 16 (the upper one as viewed in FIG. 9).

The present examples and embodiments are to be considered as illustrative and not restrictive, and the invention is not to be limited to the details given herein, but may be modified within the scope and equivalence of the appended claims.

What is claimed is:

1. A rear view mirror apparatus for a vehicle comprising:

a first mirror portion;

a second mirror portion located near the first mirror portion;

a reflectance regulating means associated with the first mirror portion to regulate the reflectance of the first mirror portion;

a trigger that generates a tuning signal when the vehicle meets a predetermined condition indicating a change of vehicle direction; and a control circuit for controlling the reflectance of the first mirror portion based on the state of the turning signal by regulating a characteristic of the reflectance regulating means.

2. The rear view mirror apparatus according to claim 1, wherein the reflectance regulating means is a first reflectance regulating means, and a second reflectance regulating means covers the second mirror portion, wherein the control circuit controls the reflectance of both mirror portions based on current driving conditions.

3. The rear view mirror apparatus according to claim 1, wherein the trigger is a first trigger, and the apparatus further comprises:

a second trigger that generates a glare signal when a predetermined condition indicating relatively strong light emitted from behind the vehicle is met, wherein the control circuit controls the reflectance of the first mirror portion based on the states of the turning signal and the glare signal.

4. The rear view mirror apparatus of claim 1, wherein the vehicle includes a turn-signal lever connected to the control circuit, and operation of the turn-signal lever in the vehicle produces the turning signal.

5. The rear view mirror apparatus of claim 1, wherein the vehicle includes a steering angle sensor connected to the control circuit, and wherein the trigger produces the turning signal when the steering angle sensor detects that the steering angle exceeds a predetermined value.

6. The rear view mirror apparatus of claim 3, wherein the second trigger includes an ambient light sensor, a rear light sensor, and a glare detection circuit that generates the glare signal based on the difference between the level of ambient light and the level of light coming from behind the vehicle.

7. The rear view mirror apparatus according to claim 1, wherein the reflectance regulating means is an electrochromic layer.

8. The rear view mirror apparatus according to claim 1, wherein the reflectance regulating means is a liquid crystal layer.

9. The rear view mirror apparatus according to claim 1, wherein the first mirror portion is convex.

10. The rear view mirror apparatus according to claim 9, wherein the first mirror portion is spheric and the second mirror portion is aspheric.

11. A rear view mirror apparatus for a vehicle comprising:
a first mirror portion;
a second mirror portion located near the first mirror portion;
a layer having variable light characteristics and covering one surface of the first mirror portion to regulate the reflectance of the first mirror portion;
a first trigger that generates a turning signal when the vehicle meets a predetermined condition indicating a change of vehicle direction;
a second trigger that generates a glare signal when a predetermined condition indicating relatively strong light emitted from behind the vehicle is met; and
a control circuit for controlling the reflectance of the first mirror portion based on the states of the turning signal and the glare signal by regulating the light characteristics of the layer.

12. The rear view mirror apparatus according to claim 11, wherein the layer is a first variable light transmission layer, and a second variable light transmission layer covers the second mirror portion, wherein the control circuit controls the reflectance of both mirror portions based on current driving conditions by regulating the light transmission of the variable light transmission layers.

13. The rear view mirror apparatus of claim 11, wherein the vehicle includes a turn-signal lever connected to the control circuit, and operation of the turn-signal lever in the vehicle produces the turning signal.

14. The rear view mirror apparatus of claim 11, wherein the vehicle includes a steering angle sensor connected to the control circuit, and wherein the first trigger produces the turning signal when the steering angle sensor detects that the steering angle exceeds a predetermined value.

15. The rear view mirror apparatus of claim 11, wherein the second trigger includes an ambient light sensor, a rear light sensor, and a glare detection circuit that generates the glare signal based on the difference between the level of ambient light and the level of light coming from behind the vehicle.

16. A method of controlling a rear view mirror for a vehicle comprising:
generating a turning signal when a predetermined condition indicating that the vehicle is changing direction is met;
generating a glare signal when a predetermined condition indicating that relatively strong light is being emitted from behind the vehicle is met;
increasing the reflectance of a first mirror part of a multi-part mirror when the signals indicate that the vehicles is turning in the absence of relatively strong rearward light.

17. The method of controlling a rear view mirror of claim 16 including reducing the reflectance of the first mirror part when relatively strong light is being emitted from behind the vehicle.

18. The method of controlling a rear view mirror of claim 16 including increasing the reflectance of a second mirror part of the multi-part mirror in the absence of relatively strong rearward light and decreasing the reflectance of the second mirror part in the presence of relatively strong rearward light.

19. A rear view mirror apparatus for a vehicle comprising:
a first mirror portion;
a second mirror portion located near the first mirror portion, wherein the average radius of curvature of the first mirror portion is greater than that of the second mirror portion;
a reflectance regulator associated with the first mirror portion to regulate the reflectance of the first mirror portion; and
a control circuit for controlling the reflectance of the first mirror portion by regulating a characteristic of the reflectance regulator, wherein the control circuit increases the reflectance of the first mirror portion to widen the driver's view when the vehicle meets a predetermined condition, wherein the predetermined condition indicates a change of vehicle direction, and the control circuit decreases the reflectance of the first mirror portion to prevent the driver from misperceiving distances when the vehicle does not meet the predetermined condition.

20. The rear view mirror apparatus according to claim 19, wherein the reflectance regulator is a first regulator, and a second reflectance regulator covers the second mirror portion, wherein the control circuit controls the reflectance of both mirror portions based on current driving conditions of the vehicle.

21. The rear view mirror apparatus according to claim 19, wherein the vehicle includes a turn-signal lever connected to the control circuit, wherein the control circuit increases the reflectance of the first mirror portion when the turn-signal lever is operated.

22. The rear view mirror apparatus according to claim 19, wherein the vehicle includes a steering angle sensor connected to the control circuit, wherein the control circuit increases the reflectance of the first mirror portion when the steering angle sensor detects that the steering angle exceeds a predetermined value.

23. The rear view mirror apparatus according to claim 20, further comprising an ambient light sensor and a rear light sensor, wherein the control circuit controls the reflectance of both mirror portions based on the difference between the level of ambient light and the level of light coming from behind the vehicle.

* * * * *